United States Patent
Miura et al.

(10) Patent No.: US 9,368,763 B2
(45) Date of Patent: Jun. 14, 2016

(54) NONAQUEOUS ELECTROLYTE SECONDARY BATTERY

(71) Applicant: Seiko Instruments Inc., Chiba-shi, Chiba (JP)

(72) Inventors: Ken Miura, Chiba (JP); Takumi Sawayama, Chiba (JP); Tadahito Suzuki, Chiba (JP); Akira Mitsuzuka, Chiba (JP); Tomomi Kobayashi, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 14/599,231

(22) Filed: Jan. 16, 2015

(65) Prior Publication Data

US 2015/0207113 A1    Jul. 23, 2015

(30) Foreign Application Priority Data

Jan. 21, 2014  (JP) ................................ 2014-008847
Oct. 30, 2014  (JP) ................................ 2014-221862

(51) Int. Cl.
*H01M 2/08*    (2006.01)
*H01M 2/02*    (2006.01)
(Continued)

(52) U.S. Cl.
CPC .......... *H01M 2/0222* (2013.01); *H01M 2/0413* (2013.01); *H01M 2/08* (2013.01); *H01M 2/1613* (2013.01); *H01M 4/485* (2013.01); *H01M 4/502* (2013.01); *H01M 10/0427* (2013.01);
(Continued)

(58) Field of Classification Search
CPC .......... H01M 10/0427; H01M 10/052; H01M 10/0525; H01M 10/0569; H01M 2010/4292; H01M 2220/30; H01M 2300/004; H01M 2/0222; H01M 2/0413; H01M 2/08; H01M 2/1613; H01M 4/485; H01M 4/502; Y02E 60/122
See application file for complete search history.

(56) References Cited

U.S. PATENT DOCUMENTS

2008/0096110 A1    4/2008  Bito et al.

FOREIGN PATENT DOCUMENTS

JP    58-135569 A         8/1983
JP    09-283102     *    10/1997   .............. H01M 2/08
(Continued)

OTHER PUBLICATIONS

Extended European Search Report in corresponding European Application No. 15152014.5, dated Apr. 21, 2015, 7 pages.

*Primary Examiner* — Patrick Ryan
*Assistant Examiner* — Ben Lewis
(74) *Attorney, Agent, or Firm* — Brinks Gilson & Lione

(57) ABSTRACT

Provided is a nonaqueous electrolyte secondary battery including a bottomed cylindrical positive electrode casing and a negative electrode casing which is fixed to an opening of the positive electrode casing through a gasket. The opening of the positive electrode casing is caulked to the negative electrode casing side to seal the accommodation space. A shortest distance L1 between a caulking tip end and the negative electrode casing in the opening of the positive electrode casing is equal to or less than 70% of an average sheet thickness of the positive electrode casing, a shortest distance L2 between a tip end of the negative electrode casing and the positive electrode casing is equal to or less than 60% of the average sheet thickness of the positive electrode casing, and a distance L3 between the tip end of the negative electrode casing and the bottom of the positive electrode casing is equal to or less than 110% of the average sheet thickness of the positive electrode casing.

11 Claims, 5 Drawing Sheets

(51) Int. Cl.
- *H01M 2/04* (2006.01)
- *H01M 4/485* (2010.01)
- *H01M 4/50* (2010.01)
- *H01M 10/0569* (2010.01)
- *H01M 2/16* (2006.01)
- *H01M 10/04* (2006.01)
- *H01M 10/052* (2010.01)
- *H01M 10/0525* (2010.01)
- *H01M 10/42* (2006.01)

(52) U.S. Cl.
CPC ........ *H01M10/052* (2013.01); *H01M 10/0569* (2013.01); *H01M 10/0525* (2013.01); *H01M 2010/4292* (2013.01); *H01M 2220/30* (2013.01); *H01M 2300/004* (2013.01); *Y02E 60/122* (2013.01)

(56) References Cited

FOREIGN PATENT DOCUMENTS

| | | |
|---|---|---|
| JP | 9-283102 A | 10/1997 |
| JP | 2000-243449 A | 9/2000 |

* cited by examiner

NONAQUEOUS ELECTROLYTE SECONDARY BATTERY

RELATED APPLICATIONS

This application claims priority under 35 U.S.C. §119 to Japanese Patent Application Nos. 2014-008847 filed on Jan. 21, 2014 and 2014-221862 filed on Oct. 30, 2014, the entire contents of which are hereby incorporated by reference.

BACKGROUND OF THE INVENTION

1. Field of the Invention

The present invention relates to a nonaqueous electrolyte secondary battery.

2. Background Art

The nonaqueous electrolyte secondary battery has been used in a power supply unit of an electronic apparatus, an electric power storage unit that absorbs a variation in electric power generation of a power generator, and the like. Particularly, a small-sized nonaqueous electrolyte secondary battery such as a coin-type (button-type) battery, has been widely employed in portable devices as a power supply for motor driving and the like, in addition to a backup power supply as a timepiece function, a backup power supply of a semiconductor memory, an auxiliary power supply of an electronic device such as a microcomputer and an IC memory, and a battery of a solar timepiece (for example, refer to JP-A-2000-243449). The coin-type nonaqueous electrolyte secondary battery employs, for example, a structure in which a positive electrode, a negative electrode, and an electrolyte are accommodated in an accommodation space surrounded by a bottomed cylindrical positive electrode casing and a negative electrode casing, and the positive electrode is electrically connected to the positive electrode casing, and the negative electrode is electrically connected to the negative electrode casing. In addition, a gasket is interposed between the positive electrode casing and the negative electrode casing, and the space between the positive electrode casing and the negative electrode casing are caulked to seal the accommodation space of the nonaqueous electrolyte secondary battery.

In addition, recently, application of the coin-type nonaqueous electrolyte secondary battery, for example, to a power supply of an electric vehicle, an auxiliary electric power storage unit of an energy converting and storage system, and the like has been examined. Particularly, in a case where a lithium manganese oxide is used as a positive electrode active material, and a silicon oxide ($SiO_x$) is used as a negative electrode active material, it is possible to obtain a nonaqueous electrolyte secondary battery in which charging and discharging characteristics are excellent with a high energy density, and a cycle lifetime is long.

Here, in a case where a non-reflow type nonaqueous electrolyte secondary battery of the related art is used for backup of a memory of a portable phone or a digital camera, an operation guarantee temperature range is −20° C. to 60° C. On the other hand, recently, realization of a nonaqueous electrolyte secondary battery, which can be used for an electronic component of an in-vehicle component such as a drive recorder under a high-temperature environment of 80° C. or higher, has been expected. However, when the nonaqueous electrolyte secondary battery is used under the high-temperature environment, an electrolytic solution inside the battery volatilizes, and lithium deteriorates due to intrusion of moisture into the battery, and thus there is a problem in that capacity greatly deteriorates.

To suppress the volatilization of the electrolytic solution from the inside of the nonaqueous electrolyte secondary battery under the high-temperature environment or the intrusion of moisture into the inside of the battery as described above, there is suggested a technology of setting a region, in which a compression ratio of the gasket interposed between the positive electrode casing and the negative electrode casing is in a predetermined range, at two or more sites around the entire periphery of the gasket (for example, refer to JP-A-58-135569).

In addition, with regard to the nonaqueous electrolyte secondary battery, there is suggested a technology in which the compression ratio of the gasket interposed between the positive electrode casing and the negative electrode casing is set to a predetermined range at three-point positions between a tip end of the positive electrode casing and the negative electrode casing, between a tip end of the negative electrode casing and the positive electrode casing, and between a folded tip end of the negative electrode casing and the positive electrode casing, and the magnitudes of compression ratios at the respective three-point positions are set in this order (for example, refer to JP-A-9-283102).

JP-A-58-135569 and JP-A-9-283102 disclose that when the compression ratio of the gasket interposed between the positive electrode casing and the negative electrode casing is set to a predetermined range, the following effects can be expected. Specifically, sealing properties of the nonaqueous electrolyte secondary battery can be raised, leakage of an electrolytic solution can be suppressed, and intrusion of moisture can be suppressed.

SUMMARY OF THE INVENTION

However, when only the compression ratio of the gasket is defined as described in JP-A-58-135569 and JP-A-9-283102, in a case where the nonaqueous electrolyte secondary battery is used or stored under a high-temperature environment, a gap occurs between the positive electrode casing or the negative electrode casing and the gasket as illustrated in a schematic cross-sectional view of FIG. 5, and thus it is still difficult to effectively prevent volatilization of the electrolytic solution and intrusion of moisture into the inside of the battery.

On the other hand, for example, the following configuration may be considered. Specifically a gap between the positive electrode casing and the negative electrode casing may be set to be narrower to increase the compression ratio of the gasket so as to further raise the sealing properties of the battery. However, when the compression ratio of the gasket is set to be too high, there is a concern that the gasket may be fractured, particularly, under a high-temperature environment. Accordingly, there is a problem in that the sealing properties of the battery deteriorate due to fracturing of the gasket. That is, it is difficult to improve the sealing properties of the battery during use or storage under a high-temperature environment by simply increasing the compression ratio of the gasket interposed between the positive electrode casing and the negative electrode casing. Accordingly, it can be said that any technology capable of effectively preventing volatilization of the electrolytic solution, intrusion of moisture into the inside of the battery, and the like is not disclosed.

The invention has been made in consideration of the above-described problems, and an object thereof is to provide a nonaqueous electrolyte secondary battery in which occurrence of a gap between a positive electrode casing or a negative electrode casing and a gasket is suppressed to improve sealing properties of the battery, and thus volatilization of an electrolytic solution or intrusion of moisture into the inside of the battery can be effectively prevented, battery characteristics do not deteriorate and sufficient discharging capacity can be retained under a high-temperature environment, the discharging capacity is large, and excellent storage characteristics are provided.

To solve the above-described problems, the present inventors have made a thorough experimental investigation. As a result, they have obtained the following finding. Specifically, when defining a distance between the positive electrode casing and the negative electrode casing at respective sites in relation to the thickness of the positive electrode casing that constitutes a secondary battery instead of defining a compression ratio of a gasket interposed between the positive electrode casing and the negative electrode casing similar to the related art, the compression ratio of the interposed gasket at each of the sites also become appropriate, and thus sealing properties can be effectively improved. According to this, the present inventors have found that volatilization of an electrolytic solution or intrusion of moisture into the inside of the battery can be prevented, and high battery characteristics can be retained even under a high-temperature environment, and they have accomplished the invention.

That is, according to an aspect of the invention, there is provided a nonaqueous electrolyte secondary battery including a bottomed cylindrical positive electrode casing, and a negative electrode casing which is fixed to an opening of the positive electrode casing through a gasket, and forms an accommodation space between the positive electrode casing and the negative electrode casing. The opening of the positive electrode casing is caulked to the negative electrode casing side to seal the accommodation space. A shortest distance L1 between a caulking tip end of the positive electrode casing and the negative electrode casing in the opening of the positive electrode casing is equal to or less than 70% of an average sheet thickness of the positive electrode casing, a shortest distance L2 between a tip end of the negative electrode casing and the positive electrode casing is equal to or less than 60% of the average sheet thickness of the positive electrode casing, and a distance L3 between the tip end of the negative electrode casing and the bottom of the positive electrode casing is equal to or less than 110% of the average sheet thickness of the positive electrode casing.

According to the invention, the shortest distance L1 between the caulking tip end of the positive electrode casing and the negative electrode casing, the shortest distance L2 between the tip end of the negative electrode casing and the positive electrode casing, and the distance L3 between the tip end of the negative electrode casing and the bottom of the positive electrode casing are set to distances satisfying the ratio in the above-described ranges with respect to the average sheet thickness of the positive electrode casing, and thus disposition and sealing conditions of the gasket are defined in an appropriate range due to the distances L1 to L3. Particularly, when the positive electrode casing and the negative electrode casing are separated from each other with a predetermined distance in order for a thickness of the gasket after compression to be equal to or less than the average sheet thickness of the positive electrode casing, it is possible to reliably perform holding-down of the negative electrode casing by caulking the positive electrode casing during sealing, and thus it is possible to improve sealing properties. According to this, even when the nonaqueous electrolyte secondary battery is used or stored under a high-temperature environment, occurrence of a gap between the positive electrode casing or the negative electrode casing and the gasket is suppressed, and sealing properties of the battery can be improved. Accordingly, it is possible to prevent volatilization of an electrolytic solution and intrusion of moisture in the air to the inside of the battery, and thus it is possible to realize a nonaqueous electrolyte secondary battery excellent in storage characteristics.

In addition, in the nonaqueous electrolyte secondary battery configured as described above, a compression ratio of the gasket at each site between the positive electrode casing and the negative electrode casing that are separated from each other with the distances L1 to L3 may be equal to or more than 50%.

In addition to the adjustment of the above-described distances L1 to L3, when the compression ratio of the gasket at each site is set to the above-described condition, it is possible to further reliably improve sealing properties of the nonaqueous electrolyte secondary battery, and particularly, it is possible to obtain significant sealing properties under a high-temperature environment.

In addition, in the nonaqueous electrolyte secondary battery configured as described above, a positive electrode which is provided on the positive electrode casing side and includes a lithium compound as a positive electrode active material, a negative electrode which is provided on the negative electrode casing side and includes $SiO_X$ ($0 \leq X < 2$) as a negative electrode active material, a separator which is disposed between the positive electrode and the negative electrode, and an electrolytic solution which fills the accommodation space and includes at least an organic solvent and a supporting salt may be accommodated in the accommodation space.

When employing a configuration including a lithium compound as the positive electrode active material and $SiO_X$ ($0 \leq X < 2$) or a lithium compound as a negative electrode active material similar to the above-described configuration, it is possible to realize a nonaqueous electrolyte secondary battery which is capable of obtaining higher discharging capacity even in the case of being used or stored under a high-temperature environment.

In the nonaqueous electrolyte secondary battery configured as described above, the positive electrode active material may include a lithium manganese oxide or a lithium titanate.

When using the above-described compound as the positive electrode active material, even in the case of being used or stored under a high-temperature environment, it is possible to realize a nonaqueous electrolyte secondary battery in which a reaction between the electrolytic solution and the electrodes is suppressed in a charging and discharging cycle, and thus a decrease in capacity can be prevented and higher discharging capacity can be obtained.

In addition, in the nonaqueous electrolyte secondary battery configured as described above, capacity balance (negative electrode capacity (mAh)/positive electrode capacity (mAh)), which is expressed by capacity of the negative electrode and capacity of the positive electrode, may be in a range of 1.56 to 2.51.

When the capacity balance between the positive electrode and the negative electrode is set to the above-described range, and a predetermined margin is secured for the capacity on a negative electrode side, even when decomposition due to a battery reaction quickly progresses, it is possible to secure a negative electrode capacity of a certain value or more. According to this, even when the nonaqueous electrolyte secondary battery is stored or used for a long period of time under a strict high-temperature and high-humidity environment, a decrease in discharging capacity does not occur, and storage characteristics are improved.

In addition, in the nonaqueous electrolyte secondary battery configured as described above, the negative electrode active material may include lithium (Li) and $SiO_X$ ($0 \leq X < 2$), and a molar ratio ($Li/SiO_X$) between lithium and $SiO_X$ may be in a range of 3.9 to 4.9.

When the negative electrode active material is configured by lithium (Li) and $SiO_X$, and a molar ratio thereof is set to the above-described range, it is possible to prevent charging abnormality and the like, and even in the case of being used or stored for a long period of time under a high-temperature environment, a decrease in discharging capacity does not occur, and storage characteristics are improved.

In addition, in the nonaqueous electrolyte secondary battery configured as described above, in the electrolytic solution, the organic solvent may be a mixed solvent which contains propylene carbonate (PC) that is a cyclic carbonate solvent, ethylene carbonate (EC) that is a cyclic carbonate solvent, and dimethoxy ethane (DME) that is a chain ether solvent.

When the organic solvent that is used in the electrolytic solution is set to the mixed solvent of respective compositions similar to the above-described configuration, it is possible to retain sufficient discharging capacity in a broad temperature range also including a high-temperature environment.

Specifically, first, when using PC and EC which have a high dielectric constant and high solubility for the supporting salt as the cyclic carbonate solvent, it is possible to obtain large discharging capacity. In addition, it is possible to obtain an electrolytic solution that is less likely to volatilize even in the case of being used or stored under a high-temperature environment when considering that PC and EC have a high boiling point.

In addition, when PC, which has a melting point lower than that of EC, and EC are mixed and used as the cyclic carbonate solvent, it is possible to improve low-temperature characteristics.

In addition, when DME having a low melting point is used as the chain ether solvent, low-temperature characteristics are improved. In addition, DME has low viscosity, and thus electrical conductivity of the electrolytic solution is improved. In addition, DME solvates with Li ions, and thus it is possible to obtain large discharging capacity as the nonaqueous electrolyte secondary battery.

In addition, in the nonaqueous electrolyte secondary battery configured as described above, in the organic solvent, a mixing ratio between the propylene carbonate (PC), the ethylene carbonate (EC), and the dimethoxy ethane (DME) may be (PC:EC:DME)=0.5 to 1.5:0.5 to 1.5:1 to 3 in terms of a volume ratio.

When a mixing ratio of the organic solvent that is used in the electrolytic solution is defined in an appropriate range similar to the above-described configuration, it is possible to attain a significant effect of improving low-temperature characteristics without deteriorating the above-described capacity retention under a high-temperature.

In addition, in the nonaqueous electrolyte secondary battery configured as described above, in the electrolytic solution, the supporting salt may be lithium bis(trifluoromethane) sulfonimide ($Li(CF_3SO_2)_2N$).

When the supporting salt that is used in the electrolytic solution is set to the above-described lithium compound, it is possible to obtain sufficient discharging capacity in a broad temperature range also including a high-temperature environment, and characteristics of the nonaqueous electrolyte secondary battery are improved.

In addition, in the nonaqueous electrolyte secondary battery configured as described above, the gasket may be formed from any one of a polypropylene resin, polyphenyl sulfide (PPS), and a polyether ether ketone (PEEK) resin.

When the gasket is configured by any one of the above-described resin materials, it is possible to prevent the gasket from being significantly deformed during use or storage under a high-temperature environment, and sealing properties of the nonaqueous electrolyte secondary battery are further improved.

In addition, in the nonaqueous electrolyte secondary battery configured as described above, the separator may be formed from glass fiber.

When the separator is configured by the glass fiber, internal resistance of the nonaqueous electrolyte secondary battery is reduced and discharging capacity is further improved when considering that a separator having excellent mechanical strength and large ion permeability can be obtained.

According to the nonaqueous electrolyte secondary battery of the invention, as described above, when the shortest distance L1 between the caulking tip end of the positive electrode casing and the negative electrode casing, the shortest distance L2 between the tip end of the negative electrode casing and the positive electrode casing, and the distance L3 between the tip end of the negative electrode casing and the bottom of the positive electrode casing are set to distances that satisfy ratios in a predetermined range with respect to the average sheet thickness of the positive electrode casing, disposition and sealing conditions of the gasket are defined in an appropriate range due to the distances L1 to L3.

According to this, even when the nonaqueous electrolyte secondary battery is used or stored under a high-temperature environment, occurrence of a gap between the positive electrode casing or the negative electrode casing and the gasket is suppressed, and thus sealing properties of the battery can be improved. As a result, volatilization of an electrolytic solution or intrusion of moisture in the air to the inside of the battery can be effectively prevented.

Accordingly, it is possible to provide a nonaqueous electrolyte secondary battery in which even under a high-temperature environment, battery characteristics do not deteriorate, sufficient discharging capacity can be retained, discharging capacity is large, and excellent storage characteristics are provided.

DETAILED DESCRIPTION OF THE PREFERRED EMBODIMENTS

Hereinafter, a configuration of a nonaqueous electrolyte secondary battery according to an embodiment of the invention will be described in detail as an example with reference to FIGS. 1 and 2. In addition, specifically, the nonaqueous electrolyte secondary battery described in the invention is a nonaqueous electrolyte secondary battery in which an active material used as a positive electrode or a negative electrode, and an electrolytic solution are accommodated in a container.

Nonaqueous Electrolyte Secondary Battery

Figure 1:
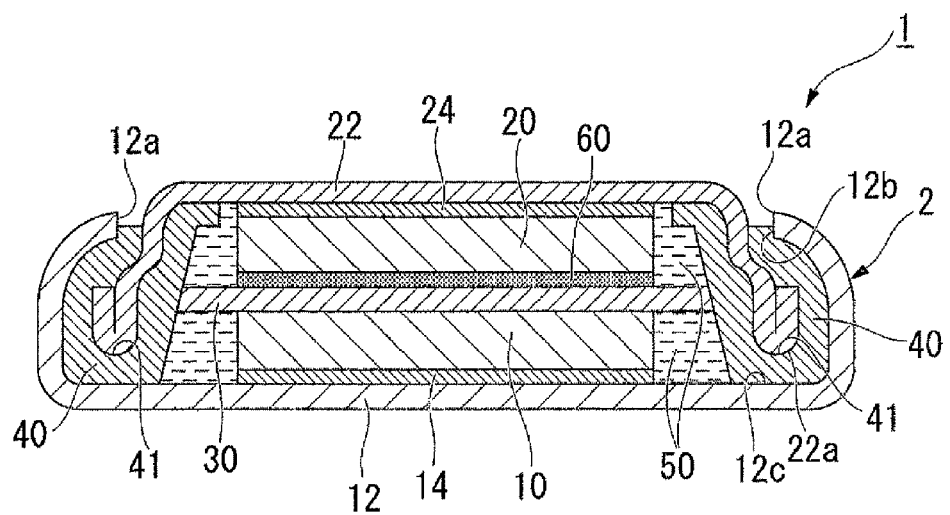
FIG. 1 is a schematic cross-sectional view illustrating a nonaqueous electrolyte secondary battery according to an embodiment of the invention.
Figure 2:
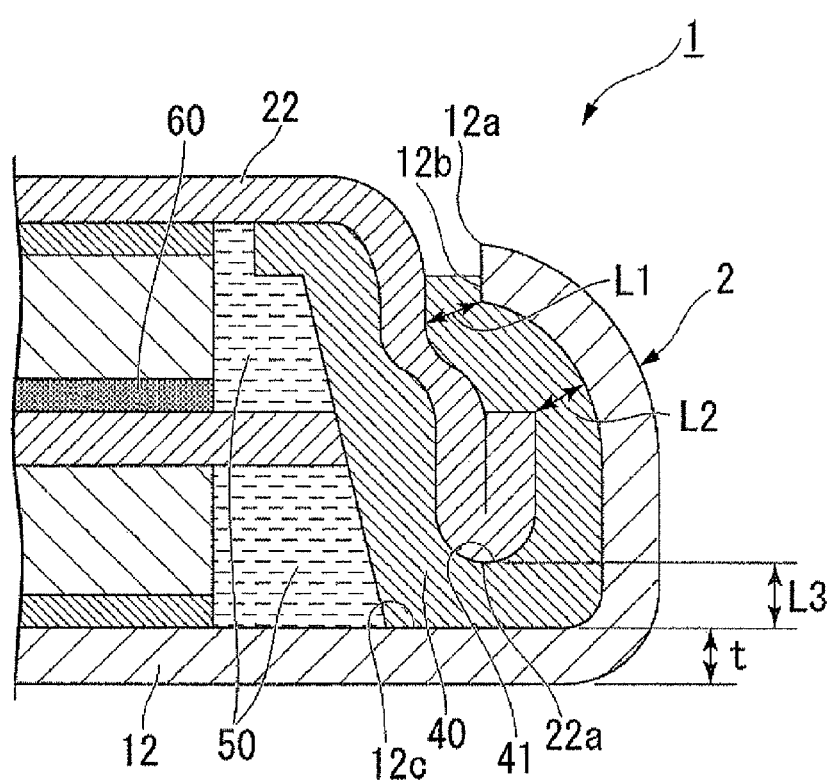
FIG. 2 is a schematic cross-sectional view illustrating the nonaqueous electrolyte secondary battery according to the embodiment of the invention, and illustrates an enlarged view of main portions illustrated in FIG. 1.

A nonaqueous electrolyte secondary battery 1 according to an embodiment of the invention as illustrated in FIGS. 1 and 2 is a so-called coin-type (button-type) battery. The nonaqueous electrolyte secondary battery 1 includes a positive electrode 10 that is capable of intercalating and deintercalating lithium ions, a negative electrode 20 that is capable of intercalating and deintercalating lithium ions, a separator 30 that is disposed between the positive electrode 10 and the negative electrode 20, and an electrolytic solution 50 that includes at least a supporting salt and an organic solvent in an accommodation container 2.

More specifically, the nonaqueous electrolyte secondary battery 1 includes an accommodation container 2. The accommodation container 2 includes a bottomed cylindrical positive electrode casing 12, and a covered cylindrical (hat-shaped) negative electrode casing 22 which is fixed to an opening 12a of the positive electrode casing 12 through a gasket 40 and forms an accommodation space between the positive electrode casing 12 and the negative electrode casing 22. The accommodation space is sealed by caulking the peripheral edge of the opening 12a of the positive electrode casing 12 to an inner side, that is, to the negative electrode casing 22 side.

In the accommodation space sealed by the accommodation container 2, the positive electrode 10 that is provided on the positive electrode casing 12 side, and the negative electrode 20 that is provided on the negative electrode casing 22 side are disposed to face each other through the separator 30. In addition, the electrolytic solution 50 fills the accommodation container 2. In addition, in an example illustrated in FIG. 1, lithium foil 60 is interposed between the negative electrode 20 and the separator 30.

In addition, as illustrated in FIG. 1, the gasket 40 is inserted along an inner peripheral surface of the positive electrode casing 12, and is connected to the outer periphery of the separator 30 to support the separator 30.

In addition, the positive electrode 10, the negative electrode 20, and the separator 30 are impregnated with the electrolytic solution 50 that fills the accommodation container 2.

In the nonaqueous electrolyte secondary battery 1 of the example illustrated in FIG. 1, the positive electrode 10 is electrically connected to an inner surface of the positive electrode casing 12 through a positive electrode current collector 14, and the negative electrode 20 is electrically connected to an inner surface of the negative electrode casing 22 through a negative electrode current collector 24. In this embodiment, the nonaqueous electrolyte secondary battery 1, which includes the positive electrode current collector 14 and the negative electrode current collector 24, illustrated in FIG. 1 is described as an example. However, there is no limitation thereto, and for example, a configuration, in which the positive electrode casing 12 also serves as a positive electrode current collector and the negative electrode casing 22 also serves as the negative electrode current collector, may be employed.

The nonaqueous electrolyte secondary battery 1 of this embodiment is schematically configured as described above, and lithium ions migrate from one side of the positive electrode 10 and the negative electrode 20 to the other side thereof, and thus electric charges can be stored (charged) or emitted (discharged).

Positive Electrode Casing and Negative Electrode Casing

In this embodiment, the positive electrode casing 12 that constitutes the accommodation container 2 is configured in a bottomed cylindrical shape as described above, and has the opening 12a having a circular shape when viewed in a plan view. As a material of the positive electrode casing 12, a material, which is known in the related art, may be used without any limitation, and examples thereof include stainless steel such as NAS64.

In addition, the negative electrode casing 22 is configured in a covered cylindrical shape (hat shape) as described above, and has a configuration that a tip end 22a thereof is inserted into the positive electrode casing 12 from the opening 12a. Examples of a material of the negative electrode casing 22 include stainless steel, which is known in the related art, similar to the material of the positive electrode casing 12, and for example, SUS304-BA and the like may be used. In addition, for example, a clad material, which is obtained by pressure-welding copper, nickel, or the like to the stainless steel, may be also used as the negative electrode casing 22.

As illustrated in FIG. 1, in a state in which the gasket 40 is interposed between the positive electrode casing 12 and the negative electrode casing 22, the peripheral edge of the opening 12a of the positive electrode casing 12 is caulked to the negative electrode casing 22 side and is fixed thereto, and thus the nonaqueous electrolyte secondary battery 1 is sealed and is retained in a state in which the accommodation space is formed. Accordingly, the maximum inner diameter of the positive electrode casing 12 is set to a dimension larger than the maximum outer diameter of the negative electrode casing 22.

In addition, in the nonaqueous electrolyte secondary battery 1 of this embodiment, a sealed shape between the positive electrode casing 12 and the negative electrode casing 22, which are fixed to each other through the gasket 40 as illustrated in FIG. 2, is configured to satisfy all of the following dimensional relationships (1) to (3).

(1) A shortest distance L1 between a caulking tip end 12b of the positive electrode casing 12 and the negative electrode casing 22 in the opening 12a of the positive electrode casing 12 is equal to or less than 70% of an average sheet thickness t of the positive electrode casing 12.

(2) A shortest distance L2 between a tip end 22a of the negative electrode casing 22 and the positive electrode casing 12 is equal to or less than 60% of the average sheet thickness t of the positive electrode casing 12.

(3) A distance L3 between the tip end 22a of the negative electrode casing 22 and the bottom 12c of the positive electrode casing 12 is equal to or less than 110% of the average sheet thickness t of the positive electrode casing 12.

In the nonaqueous electrolyte secondary battery 1 of this embodiment, when the shortest distance L1 between the caulking tip end 12b of the positive electrode casing 12 and the negative electrode casing 22, the shortest distance L2 between the tip end 22a of the negative electrode casing 22 and the positive electrode casing 12, and the distance L3 between the tip end 22a of the negative electrode casing 22 and the bottom 12c of the positive electrode casing 12, which are illustrated in FIG. 2, are set to distances satisfying the ratios in the above-described ranges with respect to the average sheet thickness t of the positive electrode casing 12, disposition and sealing conditions of the gasket 40 are defined in an appropriate range due to the distances L1 to L3. Particularly, when the positive electrode casing 12 and the negative electrode casing 22 are made to be spaced away from each other at a predetermined distance in order for the thickness of the gasket 40 after compression to be approximately the same as or smaller than the average sheet thickness t of the positive electrode casing 12, it is possible to reliably perform pressing of the negative electrode casing 22 by caulking the positive electrode casing 12 during sealing, and thus it is possible to improve sealing properties. According to this, occurrence of a gap between the positive electrode casing 12 or the negative electrode casing 22 and the gasket 40 is suppressed even in the case of use or storage for a long period of time under a high-temperature environment, and thus the sealing properties of the nonaqueous electrolyte secondary battery 1 are improved. As a result, volatilization of the electrolytic solution 50 to the outside of the battery, or intrusion of moisture included in the air to the inside of the battery can be reliably prevented, and thus it is possible to obtain the nonaqueous electrolyte secondary battery 1 which has high capacity retention rate and excellent storage characteristics under a high-temperature environment.

In addition, typically, the sheet thickness of a metal sheet material that is used in the positive electrode casing 12 or the negative electrode casing 22 is approximately 0.1 mm to 0.3 mm, and for example, an average sheet thickness of the entire positive electrode casing 12 or the entire negative electrode casing 22 may be set to approximately 0.20 mm. In the invention, the above-described respective distances L1 to L3 can be defined in a state in which the sheet thickness in the above-described range is set as the average sheet thickness t of the positive electrode casing 12.

In addition, in the example illustrated in FIGS. 1 and 2, the tip end 22a of the negative electrode casing 22 has a folded-back shape, but there is no limitation thereto. For example, the invention is also applicable to a shape which does not have a folded-back shape and in which an end surface of a metal sheet material is set as the tip end 22a.

In addition, as described above, the configuration of the invention, for example, in which the sealing conditions are defined by the distances L1 to L3 at respective sites between the positive electrode casing 12 and the negative electrode casing 22 is also applicable to batteries of various sizes in addition to a 920 size (outer diameter of φ9 mm×height of 2.0 mm) that is a typical size of the coin-type nonaqueous electrolyte secondary battery.

Gasket

As illustrated in FIG. 1, the gasket 40 is formed in an annular ring shape along the inner peripheral surface of the positive electrode casing 12, and the tip end 22a of the negative electrode casing 22 is disposed inside an annular groove 41 of the gasket 40.

In addition, for example, it is preferable that a material of the gasket 40 be a resin in which a heat deformation temperature is 230° C. or higher. When the heat deformation temperature of the resin material that is used in the gasket 40 is 230° C. or higher, even when the nonaqueous electrolyte secondary battery 1 is used or stored under a high-temperature environment, or even when heat generation occurs during use of the nonaqueous electrolyte secondary battery 1, it is possible to prevent the gasket from being significantly deformed, and thus it is possible to prevent the electrolytic solution 50 from leaking.

Examples of a material of the gasket 40 include plastic resins such as a polypropylene resin (PP), polyphenyl sulfide (PPS), polyethylene terephthalate (PET), polyamide, a liquid crystal polymer (LCP), a tetrafluoroethylene-perfluoroalkyl vinyl ether copolymer resin (PFA), a polyether ether ketone resin (PEEK), a polyether nitrile resin (PEN), a polyether ketone resin (PEK), a polyarylate resin, a polybutylene terephthalate resin (PBT), a polycyclohexane dimethylene terephthalate resin, a polyether sulfone resin (PES), a polyamino bismaleimide resin, a polyether imide resin, and a fluorine resin. Among these, it is preferable to use the polypropylene resin in the gasket 40 when considering that it is possible to prevent the gasket from being significantly deformed during use or storage under a high-temperature environment, and the sealing properties of the nonaqueous electrolyte secondary battery are further improved.

In addition, in the gasket 40, a material, which is obtained by mixing glass fiber, mica whiskers, ceramic fine powders, and the like to the above-described material in an added amount of 30 mass % or less, may be appropriately used. When using this material, it is possible to prevent significant deformation of the gasket due to a high-temperature and leakage of the electrolytic solution 50.

In addition, a sealing agent may be further applied onto an inner side surface of the annular groove of the gasket 40. As the sealing agent, asphalt, an epoxy resin, a polyamide-based resin, a butyl rubber-based adhesive, and the like may be used. In addition, after being applied onto the inside of the annular groove 41, the sealing agent is dried.

In addition, in the nonaqueous electrolyte secondary battery 1 of this embodiment, it is preferable that the distances L1 to L3 at respective sites between the positive electrode casing 12 and the negative electrode casing 22 between which the gasket 40 interposed satisfy all of the conditions (1) to (3), and the compression ratio of the gasket 40 at the respective sites (refer to the conditions (1) to (3)) corresponding to the distances L1 to L3 be equal to or more than 50%.

In addition to the adjustment of the distances L1 to L3, when the compression ratio of the gasket 40 at the respective sites is set to be equal to or more than 50%, it is possible to more reliably improve the sealing properties of the nonaqueous electrolyte secondary battery, and particularly, in a case of use or storage under a high-temperature environment, it is possible to attain more significant sealing properties.

In addition, the upper limit of the compression ratio of the gasket 40 is not particularly limited, but when the upper limit is set to be equal to or less than 95%, it is possible to retain satisfactory sealing properties without fracture of the gasket 40 under a high-temperature environment.

Electrolytic Solution

In the nonaqueous electrolyte secondary battery 1 of this embodiment, as the electrolytic solution 50, an electrolytic solution including at least an organic solvent and a supporting salt is used. In addition, in the electrolytic solution 50, it is preferable to use a mixed solvent, which contains propylene carbonate (PC) that is a cyclic carbonate solvent, ethylene carbonate (EC) that is a cyclic carbonate solvent, and dimethoxy ethane (DME) that is a chain ether solvent, as the organic solvent.

Typically, the electrolytic solution has a configuration in which the supporting salt is dissolved in a nonaqueous solvent such as an organic solvent, and characteristics of the electrolytic solution are determined in consideration of heat resistance, viscosity, and the like which are demanded for the electrolytic solution.

Generally, in a case of using the electrolytic solution, which uses the organic solvent, in the nonaqueous electrolyte secondary battery, temperature dependency of conductivity increases when considering that solubility of a lithium salt is deficient, and thus there is a problem in that characteristics at a low temperature greatly decrease in comparison to characteristics at room temperature. On the other hand, to improve low-temperature characteristics, for example, in a case of using ethyl methyl carbonate or acetic acid esters which have an asymmetric structure and are chain carbonic acid esters as the organic solvent of the electrolytic solution, there is a problem in that the characteristics of the nonaqueous electrolyte secondary battery at a high temperature conversely decrease. In addition, even in a case of using an organic solvent such as ethyl methyl carbonate in the electrolytic solution, solubility of a lithium salt is also deficient, and there is a limit to improvement of the low-temperature characteristics.

In contrast, in this embodiment, the organic solvent, which is used in the electrolytic solution 50, is set to a mixed solvent that contains PC and EC which are cyclic carbonate solvents, and DME that is a chain ether solvent. Accordingly, it is possible to realize the nonaqueous electrolyte secondary battery 1 which is capable of retaining sufficient discharging capacity in a broad temperature range including the high-temperature environment.

Specifically, first, as the cyclic carbonate solvent, PC and EC which have a high dielectric constant and high solubility for the supporting salt are used, and thus it is possible to obtain large discharging capacity. In addition, it is possible to obtain an electrolytic solution that is less likely to volatilize even in the case of being used or stored under a high-temperature environment when considering that PC and EC have a high boiling point.

In addition, when PC, which has a melting point lower than that of EC, and EC are mixed and used as the cyclic carbonate solvent, it is possible to improve low-temperature characteristics.

In addition, when DME having a low melting point is used as the chain ether solvent, low-temperature characteristics are improved. In addition, DME has low viscosity, and thus electrical conductivity of the electrolytic solution is improved. In addition, DME solvates with Li ions, and thus it is possible to obtain large discharging capacity as the nonaqueous electrolyte secondary battery.

The cyclic carbonate solvent has a structure (Chemical Formula 1) to be described below, and examples thereof include propylene carbonate (PC), ethylene carbonate (EC), butylene carbonate (BC), trifluoropropylene carbonate (TFPC), chloroethylene carbonate (CLEC), trifluoroethylene carbonate (TFEC), difluoroethylene carbonate (DFEC), vinylene carbonate (VEC), and the like. In this embodiment, particularly, from the viewpoint of improvement of capacity retention rate at a high-temperature in addition to the viewpoints of easiness of film formation on an electrode onto the negative electrode 20 and improvement of low-temperature characteristics, two kinds including PC and EC are used as the cyclic carbonate solvent having the structure (Chemical Formula 1) to be described below.

[Chem. 1]

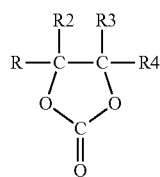

(Chemical Formula 1)

However, in Chemical Formula 1, R1, R2, R3, and R4 represent any one of hydrogen, fluorine, chlorine, an alkyl group having 1 to 3 carbon atoms, and a fluorinated alkyl group. In addition, in Chemical Formula 1, R1, R2, R3, and R4 may be the same as each other or different from each other.

In this embodiment, as described above, when using PC and EC which have a high dielectric constant and high solubility for the supporting salt as the cyclic carbonate solvent, it is possible to obtain large discharging capacity. In addition, it is possible to obtain an electrolytic solution that is less likely to volatilize even in the case of being used or stored under a high-temperature environment when considering that PC and EC have a high boiling point. In addition, when PC, which has a melting point lower than that of EC, and EC are mixed and used as the cyclic carbonate solvent, it is possible to obtain excellent low-temperature characteristics.

The chain ether solvent has a structure expressed by Chemical Formula 2 to be described below, and examples thereof include 1,2-dimethoxy ethane (DME), 1,2-diethoxy ethane (DEE), and the like. In this embodiment, particularly, DME that tends to solvate with lithium ions is used as the chain ether solvent having the structure expressed by Chemical Formula 2 to be described below particularly from the viewpoints of improving the low-temperature characteristics while securing capacity at room temperature in addition to the viewpoint of improving conductivity.

[Chem. 2]

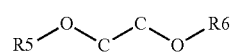

(Chemical Formula 2)

However, in Chemical Formula 2, R5 and R6 represent any one of hydrogen, fluorine, chlorine, an alkyl group having 1 to 3 carbon atoms, and a fluorinated alkyl group. In addition, R5 and R6 may be the same as each other or different from each other.

In this embodiment, as described above, when DME having a low melting point is used as the chain ether solvent, the low-temperature characteristics are improved. In addition, DME has low viscosity, and thus electrical conductivity of the electrolytic solution is improved. In addition, DME solvates with Li ions, and thus it is possible to obtain large discharging capacity as the nonaqueous electrolyte secondary battery.

In the electrolytic solution 50, a mixing ratio of respective solvents in the organic solvent is not particularly limited. However, it is preferable that the mixing ratio be, for example, in a range of (PC:EC:DME)=0.5 to 1.5:0.5 to 1.5:1 to 3 in terms of a volume ratio, more preferably in a range of 0.8 to 1.2:0.8 to 1.2:1.5 to 2.5, and still more preferably (PC:EC:DME)=(1:1:2).

When the mixing ratio of the organic solvent is in the above-described range, it is possible to more significantly obtain the effect of improving the low-temperature characteristics without deteriorating the capacity retention rate at a high temperature.

Specifically, when a mixing ratio of the propylene carbonate (PC) that is a cyclic carbonate solvent is equal to or more than the lower limit of the range, if PC having a melting point lower than that of EC and EC are mixed and used, it is possible to significantly obtain the effect of improving the low-temperature characteristics.

On the other hand, PC has a dielectric constant lower than that of EC, and thus it is difficult for PC to increase a concentration of the supporting salt. Therefore, when an amount of PC is too large, it may be difficult to obtain large discharging capacity. Accordingly, it is preferable to limit the mixing ratio of PC to a value equal to or less than the upper limit of the range.

In addition, in the organic solvent, when a mixing ratio of the ethylene carbonate (EC) that is a cyclic carbonate solvent is equal to or more than the lower limit of the range, it is possible to increase dielectric constant of the electrolytic solution 50 and solubility for the supporting salt, and it is possible to obtain large discharging capacity as the nonaqueous electrolyte secondary battery.

On the other hand, EC has high viscosity, and thus EC is deficient in electrical conductivity. In addition, EC has a high melting point, and thus when an amount of EC is too large, the low-temperature characteristics may decrease. Accordingly, it is preferable to limit the mixing ratio thereof to a value equal to or less than the upper limit of the range.

In addition, in the organic solvent, when a mixing ratio of dimethoxy ethane (DME) that is a chain ether solvent is set to be equal to or more than the lower limit of the range, a predetermined amount of DME having a low melting point is contained in the organic solvent, and thus it is possible to significantly obtain the effect of improving the low-temperature characteristics. In addition, DME has low viscosity, and thus electrical conductivity is improved. In addition, DME solvates with Li ions, and thus it is possible to obtain large discharging capacity.

On the other hand, DME has a low dielectric constant, and thus it is difficult to increase a concentration of the supporting salt. Accordingly, when an amount of DME is too large, it may be difficult to obtain large discharging capacity, and thus it is preferable to limit the mixing ratio of DME to a value equal to or less than the upper limit of the range.

As the supporting salt that is used in the electrolytic solution 50, a known Li compound, which is added to the electrolytic solution as a supporting salt in the nonaqueous electrolyte secondary battery, may be used, and there is no particular limitation to the supporting salt. Examples of the supporting salt include lithium tetrafluoroborate, lithium bisperfluoromethylsulfonyl imide, lithium bisperfluoroethylsulfonyl imide, lithium bistrifluoromethane sulfonimide (Li$(CF_3SO_2)_2N$), lithium hexafluorophosphate (LiPF$_6$), and the like in consideration of thermal stability and the like. Among these, it is preferable to use Li$(CF_3SO_2)_2N$ or LiPF$_6$ as the supporting salt when considering that it is possible to increase heat resistance of the electrolytic solution and it is possible to suppress a decrease in capacity at a high temperature.

In addition, the supporting salts may be used alone or in combination of two or more kinds thereof.

An amount of the supporting salt in the electrolytic solution 50 may be determined by the kind of the positive electrode active material to be described below and in consideration of the kind of the supporting salt and the like. For example, the amount of the supporting salt is preferably 0.1 mol/L to 3.5 mol/L, more preferably 0.5 mol/L to 3 mol/L, and still more preferably 1 mol/L to 2.5 mol/L. In addition, in a case of using a lithium manganese oxide as the positive electrode active material, the amount of the supporting salt is preferably set to approximately 1 mol/L, and in a case of using lithium titanate, the amount of the supporting salt is preferably set to approximately 1.4 mol/L.

In addition, when the concentration of the supporting salt in the electrolytic solution 50 is too high or too low, conductivity deteriorates, and thus there is a concern that this decrease has an adverse effect on battery characteristics, and thus it is preferable to set the amount of the supporting salt in the above-described range.

In the nonaqueous electrolyte secondary battery 1 of this embodiment, the distances L1 to L3 at respective sites between the positive electrode casing 12 and the negative electrode casing 22 are defined as described above, and the electrolytic solution 50 having the above-described composition is used. Accordingly, even in a case of use or storage for a long period of time under a high-temperature environment, it is possible to retain high discharging capacity, and retention characteristics become excellent.

Positive Electrode

In positive electrode 10, a kind of a positive electrode active material is not particularly limited, and the positive electrode active material includes a lithium compound. A positive electrode active material that is conventionally known in this field is used, and an active material that is obtained by mixing polyacrylic acid as a binding agent, graphite as a conductive assistant, and the like may be used. Particularly, it is preferable that the positive electrode contain at least one of a lithium manganese oxide (Li$_4$Mn$_5$O$_{12}$), lithium titanate (Li$_4$Ti$_5$O$_{12}$), MoO$_3$, LiFePO$_4$, Li$_4$CoO$_2$Mn$_5$O$_{12}$, and Nb$_2$O$_3$ as the positive electrode active material. It is more preferable that among these compounds, the positive electrode contain the lithium manganese oxide or the lithium titanate. In addition, a material such as Li$_4$CoO$_2$Mn$_5$O$_{12}$, which is obtained by adding a transition metal element such as Co and Ni to the lithium manganese oxide, may also be used.

When the above-described positive electrode active material is used in the positive electrode 10, particularly, a reaction between the electrolytic solution 50 and the positive electrode 10 at a charging and discharging cycle under a high-temperature environment is suppressed, and thus it is possible to prevent a decrease in capacity, and it is possible to increase capacity retention rate.

In addition, in this embodiment, not only one kind of the above-described materials but also a plurality of kinds of the above-described materials may be contained as the positive electrode active material.

In addition, in a case of using a granular positive electrode active material configured by the above-described material, a particle size (D50) is not particularly limited, and for example, a particle size of 0.1 μm to 100 μm is preferable, and a particle size of 1 μm to 10 μm is more preferable.

If the particle size (D50) of the positive electrode active material is less than the lower limit of the above-described preferable range, when the nonaqueous electrolyte secondary battery is exposed to a high temperature, reactivity increases, and thus handling becomes difficult. In addition, when the particle size exceeds the upper limit thereof, a discharging rate may decrease.

In addition, the "particle size (D50) of the positive electrode active material" in the invention is a particle size measured by a laser diffraction method and represents a median size.

An amount of the positive electrode active material in the positive electrode 10 is determined in consideration of discharging capacity and the like that are demanded for the nonaqueous electrolyte secondary battery 1, and the amount is preferably 50 mass % to 95 mass %. When the amount of the positive electrode active material is equal to or more than the lower limit of the preferable range, it is easy to obtain sufficient discharging capacity. When the amount of the positive electrode active material is equal to or less than the upper limit of the preferable range, it is easy to form the positive electrode 10.

The positive electrode 10 may contain a conductive assistant (hereinafter, the conductive assistant that is used in the positive electrode 10 may be referred to as a "positive electrode conductive assistant").

Examples of the positive electrode conductive assistant include carbonaceous materials such as furnace black, ketjen black, acetylene black, and graphite.

As the positive electrode conductive assistant, the above-described carbonaceous materials may be used alone or in combination of two or more kinds thereof.

In addition, an amount of the positive electrode conductive assistant in the positive electrode 10 is preferably 4 mass % to 40 mass %, and more preferably 10 mass % to 25 mass %. When the amount of the positive electrode conductive assistant is equal to or more than the lower limit of the preferable range, it is easy to obtain sufficient conductivity. In addition, in a case of molding the electrode in a pellet shape, molding becomes easy. On the other hand, when the amount of the positive electrode conductive assistant in the positive electrode 10 is equal to or less than the upper limit of the preferable range, it is easy to obtain sufficient discharging capacity in the positive electrode 10.

The positive electrode 10 may contain a binder (hereinafter, the binder that is used in the positive electrode 10 may be referred to as a "positive electrode binder").

As the positive electrode binder, a material that is known in the related art may be used, and examples thereof include polytetrafluoroethylene (PTFE), polyvinylidene fluoride (PVDF), styrene-butadiene rubber (SBR), polyacrylic acid (PA), carboxymethyl cellulose (CMC), polyvinyl alcohol (PVA), and the like. Among these, the polyacrylic acid is preferable, and a cross-linking type polyacrylic acid is more preferable.

In addition, as the positive electrode binder, the above-described materials may be used alone or in combination of two or more kinds thereof In addition, in a case of using the polyacrylic acid as the positive electrode binder, it is preferable that the polyacrylic acid be adjusted in advance to pH 3 to pH 10. For the pH adjustment in this case, for example, an alkali metal hydroxide such as lithium hydroxide, or an alkali-earth metal hydroxide such as magnesium hydroxide may be used.

An amount of the positive electrode binder in the positive electrode 10 may be set, for example, to 1 mass % to 20 mass %.

The size of the positive electrode 10 is determined in accordance with the size of the nonaqueous electrolyte secondary battery 1.

In addition, the thickness of the positive electrode 10 is also determined in accordance with the size of the nonaqueous electrolyte secondary battery 1. In a case where the nonaqueous electrolyte secondary battery 1 is a coin type for back-up which is dedicated to various electronic apparatuses, for example, the thickness may be approximately 300 μm to 1000 μm.

The positive electrode 10 may be manufactured by a manufacturing method that is known in the related art.

Examples of a method of manufacturing the positive electrode 10 include a method in which the positive electrode active material, and the positive electrode conductive assistant and/or the positive electrode binder, which are added as necessary, are mixed to obtain a positive electrode mixture, and the positive electrode mixture is compression-molded into an arbitrary shape.

A pressure during the compression molding is determined in consideration of a kind of the positive electrode conductive assistant and the like, and for example, may be set to 0.2 ton/cm² to 5 ton/cm².

As the positive electrode current collector 14, a material that is known in the related art may be used, and examples thereof include a conductive resin adhesive including carbon as a conductive filler, and the like.

Negative Electrode

In the negative electrode 20, a kind of a negative electrode active material is not particularly limited. A negative electrode active material that is conventionally known in this field is used, and examples thereof include carbon, an alloy-based negative electrode such as Li—Al, a silicon oxide, and the like. In addition, an active material that is obtained by mixing an appropriate binder, polyacrylic acid as a binding agent, graphite as a conductive assistant, and the like may be used. Particularly, it is preferable that the negative electrode active material contain at least one of SiO, $SiO_2$, Si, $WO_2$, $WO_3$, and an Li—Al alloy. When the above-described material is used in the negative electrode 20 as the negative electrode active material, a reaction between the electrolytic solution 50 and the negative electrode 20 at a charging and discharging cycle is suppressed, and thus it is possible to prevent a decrease in capacity, and cycle characteristics are improved.

In addition, in the negative electrode 20, it is more preferable that the negative electrode active material be configured by SiO or $SiO_2$, that is, a silicon oxide expressed by $SiO_X$ ($0<X\leq2$). When the silicon oxide having the above-described composition is used as the negative electrode active material, it is possible to use the nonaqueous electrolyte secondary battery 1 with a high voltage, and the cycle characteristics are improved. In addition, as the negative electrode active material, the negative electrode 20 may contain any one of different negative electrode active materials in addition to $SiO_X$ ($0<X\leq2$).

In a case of using the material as the negative electrode active material, a particle size (D50) thereof is not particularly limited, and the particle size is preferably 0.1 μm to 30 μm, and more preferably 1 μm to 10 μm. If the particle size (D50) of the negative electrode active material is less than the lower limit of the preferable range, when the nonaqueous electrolyte secondary battery is exposed to a high temperature, reactivity increases, and thus handing becomes difficult. In addition, when the particle size exceeds the upper limit thereof, a discharging rate may decrease.

In addition, in this embodiment it is preferable that the negative electrode active material in the negative electrode 20 contain lithium (Li) and $SiO_X$ ($0<X\leq2$), and a molar ratio (Li/$SiO_X$) thereof be in a range of 3.9 to 4.9. As described above, when the negative electrode active material is configured by lithium (Li) and $SiO_X$, and a molar ratio thereof is set to the above-described range, it is possible to obtain an effect capable of preventing charging abnormality and the like. In addition, even when the nonaqueous electrolyte secondary battery 1 is used or stored for a long period of time under a high-temperature environment, it is possible to obtain an effect of improving storage characteristics without a decrease in discharging capacity.

When the molar ratio (Li/$SiO_X$) is less than 3.9, Li is deficient, and thus Li deficiency occurs after use or storage for a long period of time under a high-temperature environment, and thus discharging capacity decreases.

On the other hand, when the molar ratio (Li/$SiO_X$) exceeds 4.9, Li is excessive, and thus charging abnormality may occur. In addition, metal Li remains without being trapped in $SiO_X$, and thus resistance increases and discharging capacity may decrease.

In addition, in this embodiment, it is more preferable that the molar ratio (Li/$SiO_X$) in the above-described range be set by selecting a more appropriate range in accordance with a kind of the positive electrode active material contained in the above-described positive electrode 10. For example, in a case of using lithium titanate as the positive electrode active material, it is more preferable that the molar ratio (Li/SiO$_x$) in the negative electrode active material be set to a range of 4.0 to 4.7. In addition, in a case of using lithium manganese oxide as the positive electrode active material, it is more preferable that molar ratio (Li/SiO$_x$) in the negative electrode active material be set to a range of 3.9 to 4.9. As described above, when the molar ratio (Li/SiO$_x$) of the negative electrode active material is set to a range in accordance with the kind of the positive electrode active material, it is possible to obtain an effect of suppressing an increase in initial resistance and of preventing charging abnormality and the like, or it is possible to more significantly obtain an effect of improving storage characteristics without a decrease in discharging capacity even after use or storage for a long period of time under a high-temperature environment.

An amount of the negative electrode active material in the negative electrode 20 is determined in consideration of discharging capacity and the like that are demanded for the nonaqueous electrolyte secondary battery 1, and the amount is preferably equal to or more than 50 mass %, and more preferably 60 mass % to 80 mass %.

In the negative electrode 20, when the amount of the negative electrode active material configured by the above-described material is equal to or more than the lower limit of the preferable range, it is easy to obtain sufficient discharging capacity. In addition, the amount of the negative electrode active material is equal to or less than the upper limit thereof, it is easy to mold the negative electrode 20.

The negative electrode 20 may contain a conductive assistant (hereinafter, the conductive assistant that is used in the negative electrode 20 may be referred to as a "negative electrode conductive assistant"). The negative electrode conductive assistant is the same as the positive electrode conductive assistant.

The negative electrode 20 may contain a binder (hereinafter, the binder that is used in the negative electrode 20 may be referred to as a "negative electrode binder").

Examples of the negative electrode binder include polyvinylidene fluoride (PVDF), styrene-butadiene rubber (SBR), polyacrylic acid (PA), carboxymethyl cellulose (CMC), polyimide (PI), polyimide amide (PAI), and the like. Among these, the polyacrylic acid is preferable, and a cross-linking type polyacrylic acid is more preferable.

In addition, as the negative electrode binder, the above-described materials may be used alone or in combination of two or more kinds thereof. In addition, in a case of using the polyacrylic acid as the negative electrode binder, it is preferable that the polyacrylic acid be adjusted in advance to pH 3 to pH 10. For the pH adjustment in this case, for example, an alkali metal hydroxide such as lithium hydroxide, or an alkali-earth metal hydroxide such as magnesium hydroxide may be used.

An amount of the negative electrode binder in the negative electrode 20 may be set, for example, to 1 mass % to 20 mass %.

In addition, the size and the thickness of the negative electrode 20 are the same as the size and the thickness of the positive electrode 10.

In addition, the nonaqueous electrolyte secondary battery 1 illustrated in FIG. 1 employs a configuration in which the lithium foil 60 is provided on a surface of the negative electrode 20, that is, between the negative electrode 20 and the separator 30 to be described later.

As a method of manufacturing the negative electrode 20, it is possible to employ a method in which the above-described material is used as the negative electrode active material, and the negative electrode conductive assistant and/or the negative electrode binder are mixed as necessary to prepare a negative electrode mixture, and the negative electrode mixture is compression-molded into an arbitrary shape.

A pressure during the compression molding is determined in consideration of a kind of the negative electrode conductive assistant and the like, and for example, may be set to 0.2 ton/cm$^2$ to 5 ton/cm$^2$.

In addition, the negative electrode current collector 24 may be configured by using the same material as that of the positive electrode current collector 14.

Separator

The separator 30 is interposed between the positive electrode 10 and the negative electrode 20, and as the separator 30, an insulating film, which has large ion permeability, is excellent in heat resistance, and has a predetermined mechanical strength, is used.

As the separator 30, a separator formed from a material, which is used in a separator of a nonaqueous electrode secondary battery in the related art and satisfies the above-described characteristics, may be applied without any limitation. Examples of the material include glass such as alkali glass, borosilicate glass, quartz glass, and lead glass, non-woven fabric or fiber configured by a resin such as polyphenylene sulfide (PPS), polyether ether ketone (PEEK), polyethylene terephthalate (PET), polyamide-imide (PAI), polyamide, polyimide (PI), aramid, cellulose, a fluorine resin, and a ceramic resin, and the like. Among these, as the separator 30, it is more preferable to use the non-woven fabric configured by glass fiber. The glass fiber is excellent in mechanical strength and has large ion permeability, and thus the glass fiber reduces internal resistance. Accordingly, it is possible to improve discharging capacity.

The thickness of the separator 30 is determined in consideration of the size of the nonaqueous electrolyte secondary battery 1, a material of the separator 30, and the like, and for example, may be set to approximately 5 μm to 300 μm.

Capacity Balance Between Negative Electrode and Positive Electrode

In the nonaqueous electrolyte secondary battery 1 of this embodiment, it is preferable that capacity balance (negative electrode capacity (mAh)/positive electrode capacity (mAh)), which is expressed by capacity of the negative electrode 20 and capacity of the positive electrode 10, be in a range of 1.56 to 2.51.

When the capacity balance between the negative electrode 20 and the positive electrode 10 is set to the above-described range, a predetermined margin can be secured to the negative electrode side capacity. Accordingly, for example, even when decomposition of the negative electrode active material rapidly progresses due to a battery reaction, it is possible to secure the negative electrode capacity that is equal to or more than a constant value. Accordingly, even when the nonaqueous electrolyte secondary battery 1 is used and stored for a long period of time under a strict high-temperature and high-humidity environment, a decrease in discharging capacity is suppressed, and thus it is possible to obtain an effect of improving storage characteristics.

When the capacity balance between the negative electrode 20 and the positive electrode 10 is less than 1.56, deterioration increases during use for a long period of time under a high-temperature environment, and thus capacity retention becomes difficult. On the other hand, when the capacity balance between the negative electrode 20 and the positive electrode 10 exceeds 2.51, it is difficult to obtain sufficient discharging capacity.

In the nonaqueous electrolyte secondary battery 1 of this embodiment, when the distances L1 to L3 at respective sites between the positive electrode casing 12 and the negative electrode casing 22 are defined as described above, and then the capacity balance between the negative electrode 20 and the positive electrode 10 is configured to the above-described appropriate range, even in a case of use or storage for a long period of time under a high-temperature environment, it is possible to retain high discharging capacity and storage characteristics become excellent.

Use of Nonaqueous Electrolyte Secondary Battery

As described above, the nonaqueous electrolyte secondary battery 1 of this embodiment has high sealing properties, and even in a case of use or storage for a long period of time under a high-temperature environment, high discharging capacity can be retained, sufficient discharging capacity can be obtained in a broad temperature range, and storage characteristics are excellent. Accordingly, the nonaqueous electrolyte secondary battery 1 is appropriately used as a back-up power supply with a voltage value of, for example, 2 V to 3 V.

Operational Effect

As described above, according to the nonaqueous electrolyte secondary battery 1 that is an embodiment of the invention, as described above, the shortest distance L1 between the caulking tip end 12b of the positive electrode casing 12 and the negative electrode casing 22, the shortest distance L2 between the tip end 22a of the negative electrode casing 22 and the positive electrode casing 12, and the distance L3 between the tip end 22a of the negative electrode casing 22 and the bottom 12c of the positive electrode casing 12 are set to distances satisfying ratios in a predetermined range with respect to the average sheet thickness t of the positive electrode casing 12, and thus disposition and sealing conditions of the gasket 40 are defined in an appropriate range due to the distances L1 to L3.

According to this, even when the nonaqueous electrolyte secondary battery 1 is used or stored under a high-temperature environment, occurrence of a gap between the positive electrode casing 12 or the negative electrode casing 22 and the gasket 40 is suppressed and thus sealing properties of the battery can be improved, and thus volatilization of the electrolytic solution or intrusion of moisture in the air into the inside of the battery can be effectively prevented.

Accordingly, it is possible to provide the nonaqueous electrolyte secondary battery 1 in which even under a high-temperature environment, battery characteristics do not deteriorate, sufficient discharging capacity can be retained, discharging capacity is large, and excellent storage characteristics are provided.

EXAMPLES

Next, the invention will be described in more detail with reference to Examples and Comparative Examples. However, a range of the invention is not limited by Examples. The nonaqueous electrolyte secondary battery related to the invention may be embodied by making appropriate modifications in a range not departing from the gist of the invention.

Examples 1 to 4

In Example 1, as the nonaqueous electrolyte secondary battery, the coin-type nonaqueous electrolyte secondary battery illustrated in FIG. 1 was prepared. In addition, in these examples, lithium titanate ($Li_4Ti_5O_{12}$) was used as the positive electrode active material, and SiO was used as the negative electrode active material. A nonaqueous electrolyte secondary battery (lithium secondary battery) of a coin-type (920 size) having an outer diameter of 9.0 mm and a thickness of 2.0 mm in a cross-sectional view illustrated in FIG. 1 was prepared, and sealing properties under a high-temperature and high-humidity environment were evaluated.

Preparation of Battery

With regard to the positive electrode 10, first, graphite as a conductive assistant and polyacrylic acid as a binding agent were mixed to commercially available lithium titanate ($Li_4Ti_5O_{12}$) in a ratio of lithium titanate:graphite:polyacrylic acid=90:8:2 (a mass ratio) to prepare a positive electrode mixture.

Subsequently, 98.6 mg of the positive electrode mixture that was obtained was compression-molded with a compression pressure of 2 ton/cm$^2$ to obtain a disk-shaped pallet having a diameter of 8.9 mm.

Next, the pallet (positive electrode 10) that was obtained was bonded to an inner surface of the positive electrode casing 12 formed from stainless steel (NAS64: t=0.20 mm) using a conductive resin adhesive containing carbon to integrate the pallet and the positive electrode casing 12, thereby obtaining a positive electrode unit. Then, the positive electrode unit was decompressed, heated, and dried at 120° C. for 11 hours in the air.

In addition, a sealing agent was applied to an inner side surface of the opening 12a of the positive electrode casing 12 in the positive electrode unit.

Next, with regard to the negative electrode 20, first, a material obtained by pulverizing commercially available SiO was prepared as the negative electrode active material, and graphite as a conductive agent and polyacrylic acid as a binding agent were mixed to the negative electrode active material in a ratio of 54:44:2 (mass ratio) to prepare a negative electrode mixture.

Subsequently, 15.1 mg of the negative electrode mixture that was obtained was compression-molded with a compression pressure of 2 ton/cm$^2$ to obtain a disk-shaped pallet having a diameter of 6.7 mm.

Next, the pallet (negative electrode 20) that was obtained was bonded to an inner surface of the negative electrode casing 22 formed from stainless steel (SUS304-BA: t=0.20 mm) using a conductive resin adhesive containing carbon as a conductive filler to integrate the pallet and the negative electrode casing 22, thereby obtaining a negative electrode unit. Then, the negative electrode unit was decompressed, heated, and dried at 160° C. for 11 hours in the air.

Furthermore, lithium foil 60 punched with a diameter of 6.1 mm and a thickness of 0.38 mm was compressed onto the negative electrode 20 having a pellet shape to prepare a lithium-negative electrode stacked electrode.

As described above, in these examples, nonaqueous electrolyte secondary batteries were prepared with a configuration in which the positive electrode current collector 14 and the negative electrode current collector 24, which are illustrated in FIG. 1, were not provided, the positive electrode casing 12 was allowed to have a function of the positive electrode current collector, and the negative electrode casing 22 was allowed to have a function of the negative electrode current collector.

Next, non-woven fabric configured by glass fiber was dried, and was punched into a disk shape having a diameter of 7 mm, thereby preparing the separator 30. Then, the separator 30 was placed on the lithium foil 60 that was compressed onto the negative electrode 20, and the gasket 40 formed from polypropylene was disposed at the opening of the negative electrode casing 22.

Next, an organic solvent was adjusted in accordance with the following mixing ratio (volume %), and a supporting salt was dissolved in the organic solvent to adjust the electrolytic solution. At this time, as the organic solvent, a mixed solvent was adjusted by mixing propylene carbonate (PC), ethylene carbonate (EC), and dimethoxy ethane (DME) in a ratio of (PC:EC:DME)=(1:1:2) in terms of a volume ratio.

In addition, the electrolytic solution 50, which was adjusted in the above-described procedure, filled the positive electrode casing 12 and the negative electrode casing 22 in a total amount of 40λ per one battery.

Next, the negative electrode unit was caulked to the positive electrode unit in order for the separator 30 to come into contact with the positive electrode 10. At this time, processing was performed in such a manner that the shortest distance L1 between the caulking tip end 12b of the positive electrode casing 12 and the negative electrode casing 22, the shortest distance L2 between the tip end 22a of the negative electrode casing 22 and the positive electrode casing 12, and the distance L3 between the tip end 22a of the negative electrode casing 22 and the bottom 12c of the positive electrode casing 12 became dimensions (mm) illustrated in Table 1. In addition, in the following Table 1, ratios of the distances L1 to L3 to the average sheet thickness t of the positive electrode casing 12 are also shown.

In addition, the opening of the positive electrode casing 12 was caulked to seal the positive electrode casing 12 and the negative electrode casing 22, and then the resultant object was left as is at 25° C. for seven days to prepare nonaqueous electrode secondary batteries of Examples 1 to 4.

High-Temperature and High-Humidity Storage Test: Evaluation of Sealing Properties With respect to the nonaqueous electrolyte secondary batteries of Examples 1 to 4 which were obtained in the above-described procedure, the following high-temperature and high-humidity storage test (HHTS) was performed to evaluate sealing properties (storage characteristics) under a high-temperature and high-humidity environment.

Specifically, first, each of the nonaqueous electrolyte secondary batteries, which were obtained, was discharged with a constant current of 5 µA (discharging current) under an environment of 25° C. until a voltage reached 1.5 V. Subsequently, a voltage of 2.3 V was applied for 48 hours under an environment of 25° C. Then, capacity when the nonaqueous electrolyte secondary battery was discharged with a constant current of 5 µA (discharging current) under an environment of 25° C. until a voltage reached 1.5 V was measured. The measured value is shown as initial capacity (mAh) in the following Table 1.

Next, the nonaqueous electrolyte secondary battery was left as is for 30 days while being exposed to a high-temperature and high-humidity environment of 80° C. and 90% RH by using a high-humidity and constant-temperature tester (HHTS).

In addition, with respect to the nonaqueous electrolyte secondary battery exposed to the high-temperature and high-humidity environment of the above-described conditions, capacity when the nonaqueous electrolyte secondary battery was discharged with a constant current of 5 µA (discharging current) under an environment of 25° C. until a voltage reached 1.0 V was measured. The measured value is shown as capacity (mAh) after a test (after 30 days) in the following Table 1.

In the high-temperature and high-humidity storage test in these examples, a variation (reduced state) in capacity after the test with respect to the initial capacity was set as an index of the storage characteristics, that is, the sealing properties of the battery under a high-temperature environment.

TABLE 1

| | Distance between positive electrode casing and negative electrode casing (mm) | | | Ratio with respect to thickness of positive electrode casing | | | Discharging capacity (mAh) | | |
|---|---|---|---|---|---|---|---|---|---|
| | | | | | Folded-back | | | After | Capacity |
| | L1 | L2 | L3 | Opening | portion | Bottom | Initial | 30 days | retention rate |
| Example 1 | 0.086 | 0.075 | 0.104 | 43.0% | 37.5% | 52.0% | 5.84 | 5.03 | 86.0% |
| Example 2 | 0.093 | 0.093 | 0.114 | 46.5% | 46.5% | 57.0% | 5.84 | 5.14 | 88.0% |
| Example 3 | 0.104 | 0.075 | 0.179 | 52.0% | 37.5% | 89.5% | 5.84 | 4.60 | 78.7% |
| Example 4 | 0.132 | 0.093 | 0.189 | 66.0% | 46.5% | 94.5% | 5.84 | 4.36 | 74.7% |
| Comparative Example 1 | 0.145 | 0.090 | 0.238 | 72.5% | 45.0% | 119.0% | 5.84 | 3.50 | 59.8% |
| Comparative Example 2 | 0.121 | 0.068 | 0.248 | 60.5% | 34.0% | 124.0% | 5.84 | 3.59 | 61.5% |

Comparative Examples 1 and 2

In Comparative Examples 1 and 2, nonaqueous electrolyte secondary batteries were prepared in accordance with the same conditions and the same procedure as in Example 1 except that with respect to the preparation conditions of the battery in Example 1, the shortest distance L1 between the caulking tip end 12b of the positive electrode casing 12 and the negative electrode casing 22, and/or the distance L3 between the tip end 22a of the negative electrode casing 22 and the bottom 12c of the positive electrode casing 12 were changed to dimensions shown in Table 1, and the sealing properties were evaluated under the same conditions described above, and results are shown in Table 1.

Examples 5 to 8

Preparation of Battery

In Examples 5 to 8, with respect to the preparation condition of the battery in Example 1, $Li_4Mn_5O_{12}$ was used as the positive electrode active material, and masses of $Li_4Mn_5O_{12}$ and SiO were changed to change theoretical capacity of the positive electrode and the negative electrode, thereby adjusting the capacity balance thereof, that is, capacity balance (negative electrode capacity (mAh)/positive electrode capacity (mAh)) between the positive electrode and the negative electrode to a value shown in Table 2. Coin-type nonaqueous electrolyte secondary batteries illustrated in FIG. 1 were prepared in a state in which sealing conditions, other conditions, and a procedure were set to be equal to those in Example 1 except that the capacity balance was changed.

Evaluation of Capacity Balance

With respect to the nonaqueous electrolyte secondary batteries of Examples 5 to 8 which were obtained in the above-described procedure, the following high-temperature storage test was performed to evaluate a capacity retention rate under a high-temperature environment.

Specifically, first, each of the nonaqueous electrolyte secondary batteries, which were obtained, was discharged with a constant current of 5 µA (discharging current) under an environment of 25° C. until a voltage reached 3.1 V. Subsequently, a voltage of 3.3 V was applied for 48 hours under an environment of 25° C. Then, capacity when the nonaqueous electrolyte secondary battery was discharged with a constant current of 5 µA (discharging current) under an environment of 25° C. until a voltage reached 3.1 V was measured. The measured value is shown as initial capacity (mAh) in Table 1.

Next, the above-described nonaqueous electrolyte secondary battery was left as it is for 60 days while being exposed to a high-temperature environment of 85° C. by using a high-humidity tester.

In addition, with respect to the nonaqueous electrolyte secondary battery exposed to the high-temperature environment of the above-described conditions, capacity when the nonaqueous electrolyte secondary battery was discharged with a constant current of 5 µA (discharging current) under an environment of 25° C. until a voltage reached 2.0 V was measured. The measured value is shown as capacity (mAh) after a test (after 60 days) in the following Table 2, and a capacity retention rate is also shown in the following Table 2.

In the high-temperature storage test in these examples, a variation (reduced state) in capacity after the test with respect to the initial capacity was set as an index of the capacity retention rate under a high-temperature environment.

TABLE 2

| | Capacity balance (negative electrode capacity/ positive electrode capacity) | Discharging capacity (mAh) | | Capacity retention rate |
|---|---|---|---|---|
| | | Initial | 85° C.: after storage for 60 days | |
| Reference Example | 1.32 | 8.23 | 6.27 | 76.2% |
| Example 5 | 1.56 | 7.81 | 6.53 | 83.6% |
| Example 6 | 1.72 | 7.42 | 6.57 | 88.5% |
| Example 7 | 2.18 | 6.52 | 5.85 | 89.8% |
| Example 8 | 2.51 | 6.20 | 5.66 | 91.4% |

Reference Example

In Reference Example, a coin-type nonaqueous electrolyte secondary battery, which is shown in FIG. 1, was prepared in a state in which sealing conditions, other conditions, and a procedure were set to be equal to those in Examples 5 to 8 except that with respect to the preparation conditions of the batteries in Examples 5 to 8, the capacity balance (negative electrode capacity (mAh)/positive electrode capacity (mAh)) between the positive electrode and the negative electrode was adjusted to a value shown in Table 1. The capacity retention rate was evaluated under the same conditions described above and a result thereof is shown in Table 2.

Examples 9 to 12, and Test Example 1

In Examples 9 to 12, and Test Example 1, as the negative electrode active material used in the negative electrode 20, a negative electrode active material containing lithium (Li) and $SiO_X$ ($0 \leq X < 2$) was used, and a molar ratio ($Li/SiO_X$) thereof was set to a ratio shown in the following Table 3.

In addition, in Examples 9 to 12, and Test Example 1, the nonaqueous electrolyte secondary battery 1 was set to a coin type (621 size) having an outer diameter of 6.8 mm (diameter d) and a thickness of 2.1 mm (height h1) in the cross-sectional view illustrated in FIG. 1, and respective dimensions were adjusted in such a manner that a ratio between a radius of curvature R (mm) of a side surface portion 12d of the positive electrode casing 12, a height h2 of the positive electrode casing 12, and a height h1 of the nonaqueous electrolyte secondary battery 1 satisfies the range defined in the aspect of the invention.

In addition, in Examples 9 to 12, and Test Example 1, respective capacities were set in such a manner that the capacity balance (negative electrode capacity (mAh)/positive electrode capacity (mAh)) between the capacity of the negative electrode 20 and the capacity of the positive electrode 10 became 1.95, and coin-type nonaqueous electrolyte secondary batteries illustrated in FIG. 1 were prepared in a state in which other conditions and a procedure were made to be equal to those in Example 1.

In addition, with respect to the nonaqueous electrolyte secondary batteries of Examples 9 to 12 and Test Example 1 which were obtained in the above-described procedure, the following high-temperature and high-humidity storage test (HHTS) was performed to evaluate storage characteristics under a high-temperature and high-humidity environment.

Specifically, first, each of the nonaqueous electrolyte secondary batteries, which were obtained, was discharged by using resistance of 30 kΩ as current limitation resistance under an environment of 25° C. until a voltage reached 1.0 V. Subsequently, a voltage of 2.3 V was applied for 72 hours by using constant resistance of 330Ω under an environment of 25° C.

Then, capacity when the nonaqueous electrolyte secondary battery was discharged using resistance of 30 kΩ as the current limitation resistance under an environment of 25° C. until a voltage reached 1.0 V was measured. The measured value is shown as initial capacity (mAh) in the following Table 3.

Next, the above-described nonaqueous electrolyte secondary battery was left as it is for 30 days while being exposed to a high-temperature and high-humidity environment of 80° C. and 90% RH by using a high-humidity and constant-temperature tester (HHTS).

In addition, with respect to the nonaqueous electrolyte secondary battery exposed to the high-temperature and high-humidity environment of the above-described conditions, capacity when the nonaqueous electrolyte secondary battery was discharged by using resistance of 30 kΩ as the current limitation resistance under an environment of 25° C. until a voltage reached 1.0 V was measured. The measured value is shown as capacity (mAh) after a test (after storage for 30 days) in the following Table 3.

In the high-temperature and high-humidity storage test in these examples, particularly, a variation (reduced state) in capacity after the test with respect to the initial capacity was set as an index of the storage characteristics of the battery under a high-temperature environment.

TABLE 3

| | Molar ratio (Li/SiO$_X$) | Discharging capacity (mAh) | | Capacity retention rate |
| --- | --- | --- | --- | --- |
| | | Initial | After storage for 30 days | |
| Test Example 1 | 3.81 | 2.46 | 1.62 | 65.6% |
| Example 9 | 4.04 | 2.52 | 1.94 | 76.8% |
| Example 10 | 4.27 | 2.50 | 1.97 | 78.7% |
| Example 11 | 4.44 | 2.54 | 1.98 | 78.1% |
| Example 12 | 4.63 | 2.50 | 2.36 | 94.4% |

Examples 13 to 16, and Test Example 2

In Examples 13 to 16, and Test Example 2, as the negative electrode active material used in the negative electrode 20, a negative electrode active material containing lithium (Li) and SiO$_X$ (0≤X<2) was used, and a molar ratio (Li/SiO$_X$) thereof was set to a ratio shown in the following Table 4. In addition, in Examples 13 to 16, and Test Example 2, with regard to the positive electrode active material used in the positive electrode, lithium manganese oxide (Li$_4$Mn$_5$O$_{12}$) was used instead of lithium titanate (Li$_4$Ti$_5$O$_{12}$).

In addition, in Examples 13 to 16, and Test Example 2, respective capacities were set in such a manner that the capacity balance (negative electrode capacity (mAh)/positive electrode capacity (mAh)) between the capacity of the negative electrode 20 and the capacity of the positive electrode 10 became 2.03, and coin-type nonaqueous electrolyte secondary batteries illustrated in FIG. 1 were prepared in a state in which other conditions and a procedure were made to be equal to those in Example 7 and the like.

In addition, with respect to the nonaqueous electrolyte secondary batteries of Examples 13 to 16, and Test Example 2 which were obtained in the above-described procedure, the following high-temperature storage test was performed to evaluate capacity retention rate under a high-temperature environment.

Specifically, first, each of the nonaqueous electrolyte secondary batteries, which were obtained, was constant-current-discharged by using resistance of 47 kΩ as current limitation resistance under an environment of 25° C. until a voltage reached 2.0 V. Subsequently, a voltage of 3.1 V was applied for 72 hours by using constant resistance of 330Ω under an environment of 25° C.

Then, capacity when the nonaqueous electrolyte secondary battery was discharged using resistance of 47 kΩ as the current limitation resistance under an environment of 25° C. until a voltage reached 2.0 V was measured. The measured value is shown as initial capacity (mAh) in the following Table 4.

Next, the above-described nonaqueous electrolyte secondary battery was left as it is for 60 days while being exposed to a high-temperature environment of 85° C. by using a high-temperature tester.

In addition, with respect to the nonaqueous electrolyte secondary battery exposed to the high-temperature environment of the above-described conditions, capacity when the nonaqueous electrolyte secondary battery was constant-current-discharged by using resistance of 47 kΩ as the current limitation resistance under an environment of 25° C. until a voltage reached 2.0 V was measured. The measured value is shown as capacity (mAh) after a test (after 60 days) in the following Table 4, and a capacity retention rate is also shown in the following Table 4.

In the high-temperature storage test in these examples, a variation (reduced state) in capacity after the test with respect to the initial capacity was set as an index of the capacity retention rate under a high-temperature environment.

TABLE 4

| | Molar ratio (Li/SiO$_X$) | Discharging capacity (mAh) | | Capacity retention rate |
| --- | --- | --- | --- | --- |
| | | Initial | After storage for 60 days | |
| Test Example 2 | 3.66 | 7.42 | 5.65 | 76.1% |
| Example 13 | 3.95 | 7.46 | 6.27 | 84.5% |
| Example 14 | 4.25 | 7.50 | 6.26 | 84.4% |
| Example 15 | 4.55 | 7.49 | 6.39 | 86.1% |
| Example 16 | 4.87 | 7.50 | 6.48 | 87.3% |

Evaluation Result

Figure 3:
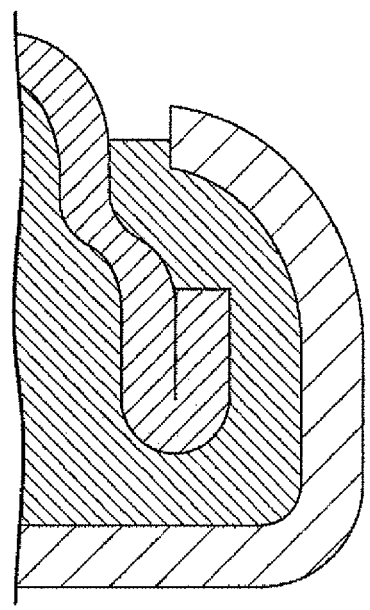
FIG. 3 is a schematic cross-sectional view illustrating an example of the nonaqueous electrolyte secondary battery according to the embodiment of the invention.

As shown in Table 1, in the nonaqueous electrolyte secondary batteries of Examples 1 to 4 in which the shortest distance L1 between the caulking tip end 12b of the positive electrode casing 12 and the negative electrode casing 22, the shortest distance L2 between the tip end 22a of the negative electrode casing 22 and the positive electrode casing 12, and the distance L3 between the tip end 22a of the negative electrode casing 22 and the bottom 12c of the positive electrode casing 12 were set to ranges defined in the invention (the aspect), the capacity retention rate after the high-temperature and high-humidity test for 30 days was 74.7% to 88.0% and was higher in comparison to Comparative Examples 1 and 2 (59.8% and 61.5%), and thus it could be seen that the capacity retention rate under a high-temperature and high-humidity environment was excellent. In addition, as illustrated in a schematic cross-sectional view of FIG. 3, the nonaqueous electrolyte secondary battery of Example 1 retained satisfactory sealing properties without occurrence of a gap and the like at the inside of the battery even after the high-temperature and high-humidity test.

From these results, it is apparent that in the nonaqueous electrolyte secondary batteries of Examples 1 to 4, an inner electrolyte did not volatilize to the outside, and moisture in the air did not intrude into the inside of the battery, and thus satisfactory sealing properties were provided.

In addition, as shown in Table 2, in Examples 5 to 8 in which sealing conditions of the positive electrode casing 12 and the negative electrode casing 22, which were disposed with the gasket 40 interposed therebetween, were set to the ranges defined in the invention (the aspect), and in which the capacity balance (negative electrode capacity (mAh)/positive electrode capacity (mAh)) between the negative electrode and the positive electrode was set in the range defined in the aspect of the invention, it can be seen that the capacity retention rate after the high-temperature test for 60 days is 83.6% to 89.8% and is very excellent in comparison to Reference Example (76.2%). From this result, it is apparent that when the sealing conditions between the positive electrode casing 12 and the negative electrode casing 22, which are disposed with the gasket 40 interposed therebetween, are optimized, and the capacity balance between the negative electrode and the positive electrode is set in an appropriate range, the capacity retention rate under a high-temperature environment is significantly improved.

Figure 4:
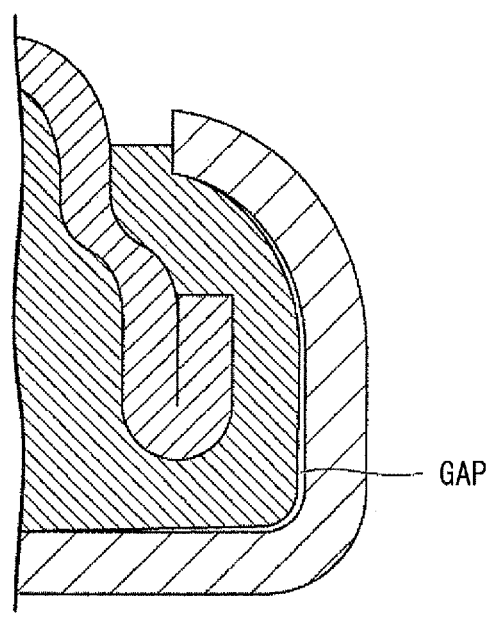
FIG. 4 is a schematic cross-sectional view illustrating a comparative example that is a nonaqueous electrolyte secondary battery having a configuration of the related art.
Figure 5:
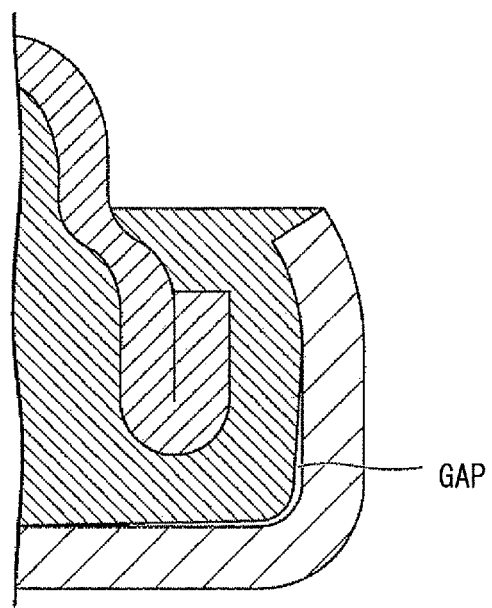
FIG. 5 is a schematic cross-sectional view illustrating the nonaqueous electrolyte secondary battery of the related art.

On the other hand, in Comparative Example 1 shown in Table 1, the capacity retention rate after the high-temperature and high-humidity test for 30 days is 59.8%, and in Comparative Example 2, the capacity retention rate is 61.5%, and these capacity retention rates are lower those in Examples 1 to 4. In addition, as illustrated in a schematic cross-sectional view of FIG. 4, in the nonaqueous electrolyte secondary battery of Comparative Example 1, a gap occurred between the positive electrode casing and the gasket after the high-temperature and high-humidity test, and thus it can be seen that the sealing properties deteriorate.

From these results, in Comparative Examples 1 and 2, among the distances L1 to L3, the shortest distance L1 between the caulking tip end 12b of the positive electrode casing 12 and the negative electrode casing 22, and/or the distance L3 between the tip end 22a of the negative electrode casing 22 and the bottom 12c of the positive electrode casing 12 deviate from the ranges defined in the aspect of the invention, and thus it is apparent that a gap and the like occurred between the positive electrode casing 12 and the gasket 40 (or between the negative electrode casing 22 and the gasket 40), and the electrolyte solution volatilized to the outside or moisture in the air intruded into the inside of the battery, and thus discharging capacity decreased.

Here, in Reference Example shown in Table 2, the sealing conditions between the positive electrode casing 12 and the negative electrode casing 22, which were disposed with the gasket 40 interposed therebetween, were set in the range defined in the invention (the aspect), and the capacity retention rate after the high-temperature test did not have a problem with regard to a range in practical use, but the capacity retention rate was lower in comparison to Examples 5 to 8. From the result, as is the case with Examples 5 to 8, in a case where the capacity balance between the negative electrode and the positive electrode is set in an appropriate range defined in the aspect of the invention in addition to adjustment of the sealing conditions, it can be seen that an effect of further improving the capacity retention rate after the high-temperature test can be obtained.

In addition, as shown in Table 3 and Table 4, in Examples 9 to 16 in which the sealing conditions between the positive electrode casing 12 and the negative electrode casing 22 were set in the range defined in the invention (the aspect), an active material containing lithium (Li) and $SiO_X$ (0≤X<2) was used as the negative electrode active material used in the negative electrode 20, and a molar ratio (Li/$SiO_X$) thereof was limited to an appropriate range (3.9 to 4.9), the capacity retention rate after the high-temperature and high-humidity storage test is 76.8% to 94.4%, the capacity retention rate after the high-temperature storage test is 84.5% to 87.3%, and these capacity retention rates are higher in comparison to Test Example 1 or Test Example 2 in which an amount of Li was smaller, and thus it can be seen that the capacity retention rate in an high-temperature and high-humidity environment and in a high-temperature environment is excellent.

Here, as shown in Table 3, for example, in a case of using lithium titanate as the positive electrode active material in the positive electrode 10, when the molar ratio (Li/$SiO_X$) between Li and $SiO_X$ in the negative electrode active material is set to a range of 4.0 to 4.7, it can be seen that an excellent capacity retention rate can be obtained even under a high-temperature and high-humidity environment.

In addition, as shown in Table 4, in a case of using lithium manganese oxide as the positive electrode active material in the positive electrode 10, when the molar ratio (Li/$SiO_X$) between Li and $SiO_X$ in the negative electrode active material is in a range of 3.9 to 4.9 as described above, it can be seen that an excellent capacity retention rate can be obtained even under a high-temperature environment.

From the results of Examples described above, when the nonaqueous electrolyte secondary battery is configured under the sealing conditions defined in the invention, it is possible to improve sealing properties of a battery, and it is possible to effectively prevent occurrence of volatilization of the electrolytic solution or intrusion of moisture in the air into the inside of the battery under a high-temperature environment, and thus it is apparent that the battery characteristics do not deteriorate, the discharging capacity is large, and excellent storage characteristics can be obtained.

According to the nonaqueous electrolyte secondary battery of the invention, when the above-described configurations are employed, even in a case of use or storage under a high-temperature environment, the battery characteristics do not deteriorate, the discharging capacity is large, and excellent storage characteristics can be obtained. Accordingly, when the invention is applied, for example, to a nonaqueous electrolyte secondary battery that is used in a field of various electronic apparatuses, it is also possible to contribute to an improvement in performance of various apparatuses.

What is claimed is:

1. A nonaqueous electrolyte secondary battery, comprising:
    a bottomed cylindrical positive electrode casing; and
    a negative electrode casing which is fixed to an opening of the positive electrode casing through a gasket, and forms an accommodation space between the positive electrode casing and the negative electrode casing,
    wherein the opening of the positive electrode casing is caulked to the negative electrode casing side to seal the accommodation space,
    a shortest distance L1 between a caulking tip end of the positive electrode casing and the negative electrode casing in the opening of the positive electrode casing is equal to or less than 70% of an average sheet thickness of the positive electrode casing,
    a shortest distance L2 between a tip end of the negative electrode casing and the positive electrode casing is equal to or less than 60% of the average sheet thickness of the positive electrode casing, and
    a distance L3 between the tip end of the negative electrode casing and the bottom of the positive electrode casing is equal to or less than 110% of the average sheet thickness of the positive electrode casing.

2. The nonaqueous electrolyte secondary battery according to claim 1,
    wherein a compression ratio of the gasket at each site between the positive electrode casing and the negative electrode casing that are separated from each other with the distances L1 to L3 is equal to or more than 50%.

3. The nonaqueous electrolyte secondary battery according to claim 1,
    wherein a positive electrode which is provided on the positive electrode casing side and includes a lithium compound as a positive electrode active material, a negative electrode which is provided on the negative electrode casing side and includes $SiO_X$ (0≤X<2) as a negative electrode active material, a separator which is disposed between the positive electrode and the negative electrode, and an electrolytic solution which fills the accommodation space and includes at least an organic solvent and a supporting salt are accommodated in the accommodation space.

4. The nonaqueous electrolyte secondary battery according to claim 3,
    wherein the positive electrode active material includes a lithium manganese oxide or a lithium titanate.

5. The nonaqueous electrolyte secondary battery according to claim 3,
    wherein capacity balance (negative electrode capacity (mAh)/positive electrode capacity (mAh)), which is expressed by capacity of the negative electrode and capacity of the positive electrode, is in a range of 1.56 to 2.51.

6. The nonaqueous electrolyte secondary battery according to claim 3, wherein the negative electrode active material includes lithium (Li) and $SiO_X$ ($0 \leq X < 2$), and a molar ratio (Li/$SiO_X$) between lithium and $SiO_X$ is in a range of 3.9 to 4.9.

7. The nonaqueous electrolyte secondary battery according to claim 3,
wherein in the electrolytic solution, the organic solvent is a mixed solvent which contains propylene carbonate (PC) that is a cyclic carbonate solvent, ethylene carbonate (EC) that is a cyclic carbonate solvent, and dimethoxy ethane (DME) that is a chain ether solvent.

8. The nonaqueous electrolyte secondary battery according to claim 7,
wherein in the organic solvent, a mixing ratio between the propylene carbonate (PC), the ethylene carbonate (EC), and the dimethoxy ethane (DME) is (PC:EC:DME)=0.5 to 1.5:0.5 to 1.5:1 to 3 in terms of a volume ratio.

9. The nonaqueous electrolyte secondary battery according to claim 3,
wherein in the electrolytic solution, the supporting salt is lithium bis(trifluoromethane) sulfonimide ($Li(CF_3SO_2)_2N$).

10. The nonaqueous electrolyte secondary battery according to claim 3,
wherein the gasket is formed from any one of a polypropylene resin, polyphenyl sulfide (PPS), and a polyether ether ketone (PEEK) resin.

11. The nonaqueous electrolyte secondary battery according to claim 3,
wherein the separator is formed from glass fiber.

* * * * *